UNITED STATES PATENT OFFICE.

HENRY F. BEMENDEFER, OF BLOOMVILLE, OHIO.

CALCIMINE COMPOUND.

SPECIFICATION forming part of Letters Patent No. 350,652, dated October 12, 1886.

Application filed January 23, 1886. Serial No. 189,476. (No specimens.)

*To all whom it may concern:*

Be it known that I, HENRY F. BEMENDEFER, a citizen of the United States, and a resident of Bloomville, in the county of Seneca and State of Ohio, have invented certain new and useful Improvements in Calcimine Compounds; and I do hereby declare that the following is a full, clear, and exact description of the invention, which will enable others skilled in the art to which it appertains to make and use the same.

My invention has relation to compounds for whitewashing and calcimining purposes, as well as for purposes where a superior grade of white lime is required; and it consists in the calcimining compound which will be hereinafter more fully described and claimed.

To prepare this compound, I first prepare a very superior grade of white lime by burning limestone of the best and purest quality, and removing by any suitable means all foreign matter from the burnt lime. I then slake the lime by any of the well-known methods, and to each barrel of the same I add the following ingredients: one pound of white glue, one-half pound of sulphate of zinc, five pounds of salt, one-half pound of gum-arabic, a suitable quantity of ultramarine blue to give the compound the desired shade, and one ounce of bismuth. The glue is first dissolved in hot water, and after the salt has been dissolved in a suitable quantity of cold water the solution is mixed with the glue, after which the solution of gum-arabic is added. This compound solution is then stirred into the lime, after which I add the sulphate of zinc and the solution of ultramarine blue, and, finally, the bismuth, care being taken to agitate the whole well, so as to form a thoroughly homogeneous mixture. I then let all the superfluous water drain off and dry the composition until it becomes of the consistency of ordinary pudding, when it is put up in cans and hermetically sealed. The compound is used by the addition of water in the same manner as ordinary whitewash or calcimine.

The advantages of this compound are that it will not harden, even if it is exposed to the air for a considerable period, owing to the addition of the bismuth and sulphate of zinc. It imparts a hard and smooth finish, which, after exposure to the atmospheric air, gradually becomes as hard as stone, and can be washed with hot or cold water without injury.

Having thus described my invention, I claim as new and desire to secure by Letters Patent of the United States—

The herein-described calcimining compound consisting of slaked lime, white glue, sulphate of zinc, salt, gum-arabic, ultramarine blue, and bismuth, mixed in about the proportions set forth.

In testimony that I claim the foregoing as my own I have hereunto affixed my signature in presence of two witnesses.

HENRY F. BEMENDEFER.

Witnesses:
  WILLIAM RICHARD,
  PAUL MILLER.